US007013033B2

(12) United States Patent
Arena et al.

(10) Patent No.: US 7,013,033 B2
(45) Date of Patent: Mar. 14, 2006

(54) SYSTEM FOR THE AUTOMATIC ANALYSIS OF IMAGES SUCH AS DNA MICROARRAY IMAGES

(75) Inventors: Paolo Arena, Catania (IT); Luigi Fortuna, Syracuse (IT); Mario Lavorgna, Bacoli (IT); Luigi Occhipinti, Ragusa (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 681 days.

(21) Appl. No.: 09/929,833

(22) Filed: Aug. 14, 2001

(65) Prior Publication Data

US 2002/0097900 A1 Jul. 25, 2002

(30) Foreign Application Priority Data

Aug. 25, 2000 (EP) .................................. 00830588

(51) Int. Cl.
*G06K 9/00* (2006.01)

(52) U.S. Cl. ...................................... 382/129; 382/156

(58) Field of Classification Search ................ 382/128, 382/129, 133, 156, 158; 706/20, 22, 28, 706/29, 38, 924

See application file for complete search history.

(56) References Cited

U.S. PATENT DOCUMENTS

| | | | | |
|---|---|---|---|---|
| 5,140,670 | A | 8/1992 | Chua et al. | 395/24 |
| 6,731,781 | B1 * | 5/2004 | Shams et al. | 382/129 |
| 2002/0110267 | A1 * | 8/2002 | Brown et al. | 382/128 |
| 2003/0022164 | A1 * | 1/2003 | Mills, Jr. | 435/6 |
| 2004/0063136 | A1 * | 4/2004 | Gulati | 435/6 |

OTHER PUBLICATIONS

Arena et al., "DNA chip image processing via Cellular Neural Networks," Proc. IEEE Int. Symp. on Circuits and Systems, May 2001, pp. III-345 through III-348.*

Fortuna et al., "Cellular Neural Networks: A Paradigm for Nonlinear Spatio-Temporal Processing," IEEE Circuits and Systems Magazine, vol. 1, No. 4, Fourth Quarter 2001, pp. 6-21.*

European Search Report from European priority application No. 00 830588, filed Aug. 25, 2000.

Roska, T et al., *Review of CMOS Implementations of the CNN Universal Machine-Type Visual Microprocessors*, IEEE International Symposium on Circuits and Systems, May 28-31, 2000 pp. II-120-II-123 XP002159318.

Derisi, J et al., *Use of a CDNA Microarray to Analyse Gene Expression Patterns In Human Cancer*, Nature Genetics, New York, NY, vol. 11, Dec. 11, 1996, pp 457-460 XP000971491 (Abst. only).

Chau L.O. et al., *Cellular Neural Networks: Applications*, IEEE Transactions on Circuits and Systems, vol. 35, No. 10, Oct. 1988, pp 1273-1290, XP002159319.

* cited by examiner

*Primary Examiner*—Andrew W. Johns
(74) *Attorney, Agent, or Firm*—Lisa K. Jorgenson; Allen, Dyer, Doppelt, Milbrath & Gilchrist, P.A.

(57) ABSTRACT

The system can be used for the automatic analysis of images, including a matrix of spots, such as images of DNA microarrays after hybridization. The system can be associated—and preferably integrated in a single monolithic component implementing VLSI CMOS technology—to a sensor for acquiring the images. The system includes a circuit for processing the signals corresponding to the images, configured according to a cellular neural network (CNN) architecture for the parallel analogue processing of signals.

18 Claims, 5 Drawing Sheets

SYSTEM FOR THE AUTOMATIC ANALYSIS OF IMAGES SUCH AS DNA MICROARRAY IMAGES

FIELD OF THE INVENTION

This invention relates to the sector of analysis of images and was developed with special reference to the possible application to DNA analysis, especially in view of the automatic analysis of the images generated by means of a so-called DNA microarray or DNA chip.

BACKGROUND OF THE INVENTION

The automatic analysis of DNA is mainly based on the examination of the messenger RNA which controls the way in which the various parts of the genes are activated or deactivated to create certain types of cells.

If the gene is expressed in a single way, it can generate a normal muscular cell, while if it is expressed in another way it can generate a tumour.

By comparing the different expressions of genes, researchers aim at discovering the way to predict and prevent cancer.

Another possible application is the so-called pharmacogenomics, a discipline in which scientists attempt to correlate the smallest DNA variations of a person with reaction to various substances, such as drugs.

Numerous other possible applications are being implemented, developed and studied.

Over the past years, a technique based on the use of so-called DNA chips has been developed to allow automatic DNA analysis.

Essentially, DNA chips are small flat surfaces on which some rows, called probes, of one half of the double helix of DNA, are deposited according to a typical matrix configuration.

Since each half of the double helix of DNA is naturally bonded to its complementary other half in a process called hybridisation, the DNA chip can be used to identify the presence of particular genes in a biological specimen.

These chips are called microarrays in relation to their matrix structure, which may also be linear, and can be made employing different technologies, including semiconductor technology, on a variety of surfaces, including glass and plastic.

The use of DNA microarrays to delineate the expression of genes is the most important application of "biochips". This method has completely replaced the previous methods which had the disadvantage of needing to be repeated either on each gene or on a restricted number of genes and were also difficult to automate.

For a general illustration of a possible application of these methods, useful reference can be made to the work by DeRisi J et. al., "Use of cDNA microarray to analyse gene expression patterns in human cancer", NatGenet December 1996; 14 (4), 457–60.

Usually, DNA microarrays are used as interconnected memory chips in order to compare specimens of DNA from a patient against known, preserved specimens of DNA.

This is because DNA carries an electrical charge and this charge can be read on a chip, exactly in the way that occurs in a cell in a matrix of memory cells.

In many DNA chips, the coupling of arrays of DNA is signalled by means of fluorescent materials.

Notwithstanding, the procedure for analysing the chip, in particular to detect the levels of fluorescence, is rather costly.

Various methods have been developed to avoid these problems.

For example, according to a known solution, developed by the company Micro Sensors in collaboration with the company Motorola, DNA probe coupling is detected by means of bio-electronic methods.

This solution essentially consists in depositing a number from 10 to 50 DNA probes on a printed circuit.

An organic atom containing iron which can generate an electronic signal when the DNA rows are coupled, is used instead of fluorescence.

Parallel methods, allowing the simultaneous quantification of the level of expression of a very high number of genes by means of simultaneous querying, with a high sensitivity and fidelity of acknowledgement of the expression profile of a complete library of genes, have been developed over the past years.

With a certain degree of approximation, yet essentially close to reality, the methods based on the use of microarrays of genes can be ideally related to some main classes.

The method developed by Prof. Brown represents a first class of solutions. This method permits, by means of robot micro-machining, to chemically immobilize in 2 by 2 cm micro-grids fragments of cDNA (complementary DNA), or DNA reconstructed on the basis of RNA by reverse transcription. In this way, microarrays containing 10,000 individual cDNA elements are formed. The DNA fragment to be analyzed is marked with fluorescent groups so to obtain different types of sensors to immediately distinguish the fragments of DNA by means of the color of the corresponding fluorescent group with which they are treated. In this way, the microarray can be analyzed simultaneously during the hybridisation phase. The micro-grid is read by means of a confocal microscope at the end of the hybridisation phase providing a two-dimensional image in which colored pins, or spots, appear arranged in a grid. The intensity of the various colors and their combinations is directly correlated to the intensity of the light output by fluorescence by the respective probes and to the degree of affinity between the probes and the individual genes deposited on the grid.

Another technique is known as micro-spotting. In this technique, a robot arm is dipped in a DNA material in correspondence with an array of pins which is then impressed on a glass support.

Another method based on the use of microarrays was introduced by Affymatrix. This technique employs synthetic oligonucleotides, instead of natural fragments of DNA for constructing the micro-grid. These fragments are deposited on the grid by means of photolithography. In particular, masks for exposing some parts of a glass wafer on which certain chemical processes occur are used to make single row DNA sensors.

The use of photolithography, in combination with the chemical synthesis of oligonucleotides, results in a presence of approximately 100,000 genes in a single microarray which, according to current estimates, compose the complete library of mapped human characteristics.

The methods described provide as a final result an image which expresses the degree of genic expression in a fragment of DNA to be analysed by means of shades of different colors or combinations of colors.

The main advantage of the microarray method consists in the possibility of simultaneously analysing an extremely high number of genes.

This is because the information associated with the different cells present on the DNA chip can be processed in parallel with the consequent possibility of increasing the number of cells in the microarray to values in the order of 10,000–100,000 cells.

In this way, systems for the automated analysis of fragments of DNA can be provided which employ processing techniques of the images derived from microarray after hybridisation.

This notwithstanding, the systems of this type implemented to date are based on the analysis of very large images (a number of pixels which is one to two orders of magnitude greater than the number of cells which form the micro-grid). These images can be acquired in parallel, but are transferred and processed in a sequential fashion, as usually occurs in analysis techniques employing digital microprocessors, whereby processing speed is considerably penalised.

Consequently, the idea of using a DNA chip has not been fully exploited to date, due to the difficulty in achieving real time analysis of the respective fluorescent images. Moreover, since diagnostic protocols generally require a certain number of microarray-based experiments, the time required for analysing the resulting images (processing times in the range of 10 to 30 minutes) abnormally hinder the efficacy of such method.

SUMMARY OF THE INVENTION

The need therefore exists to provide an alternative system able to process images in real time, such as the images generated by a microarray of the type described. The object of this invention is to provide a system which allows efficient, rapid automatic analysis of images, such as the images generated by a DNA. chip after hybridisation, to identify the affinities between the analysed specimen and the fragments of DNA on the DNA chip.

This and other objects, features, and advantages in accordance with the present invention are provided by a system for automatically analyzing the images from a DNA chip after hybridisation.

In essence, according to the currently preferred embodiment, the invention provides for making a system which provides automatic analysis of the images from a DNA chip after hybridization. This is attained by acquiring the images using optical matrix sensors and processing the acquired images using a Cellular Neural Network (CNN). Such a processing is essentially analog and is achieved spatially on the entire development of the microarray matrix.

For a general illustration of the characteristics of a cellular neural network, useful reference can be made to document U.S. Pat. No. 5,140,670.

According to the currently preferred embodiment of the invention, images are analyzed by means of a computing process which accounts for the physical-chemical rules at the basis of reactions on the microarray.

In a particularly advantageous way, the cellular neural network architecture comprises a matrix of cells which are locally interconnected by means of synaptic connections, the matrix presenting a spatial distribution which is essentially correlated to the matrix form of the processed images.

A system according to the invention can be easily made according to a system-on-a-chip configuration, in which the entire acquisition and processing system of the images is integrated on a single chip, for example implementing VLSI CMOS technologies. Reference to this matter can be found in the work by Rodriguez-Vasquez A. et al., "Review of CMOS Implementations of the CNN Universal Machine-Type Visual Microprocessors" published in Proceedings of ISCAS 2000 (IEEE Int. Symposium on Circuits and Systems), Geneva, May 28–31, 2000.

More in particular, this invention relates to a system integrated in a monolithic fashion on a semiconductor for automatically analyzing images, such as images from a microarray of the types comprising optical matrix sensors for the acquisition of images and to a high computing power parallel analog processing architecture, based on the implementation of cellular neural network. Moreover, the invention provides integration of the entire image acquisition and processing system on a single chip.

Characteristics and advantages of this invention will be illustrated with reference to a preferred embodiment, as non-limiting examples, in the enclosed drawings.

DETAILED DESCRIPTION OF THE PREFERRED

As mentioned above, the solution according to this invention offers an advantageous alternative with respect to traditional methods based on the analysis of fluorescence images generated by means of a DNA chip. In particular, the solution according to this invention utilizes the class of arrays (generally two-dimensional) of analog processors known as cellular neural networks (CNN) and implements a system which is able to process such images in real time.

Figure 1:
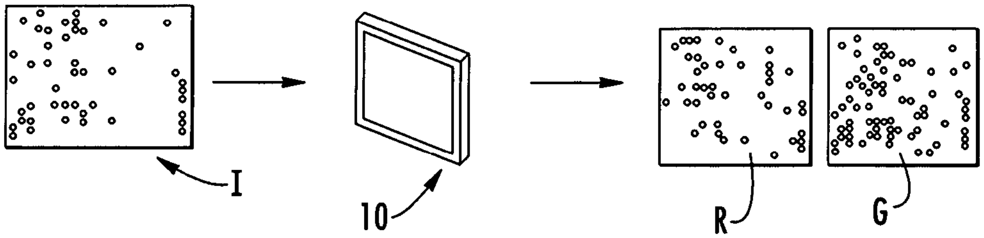
FIG. 1 is a schematic view of a system for automatically analyzing images from a DNA chip after hybridisation according to the present invention.
Figure 3:
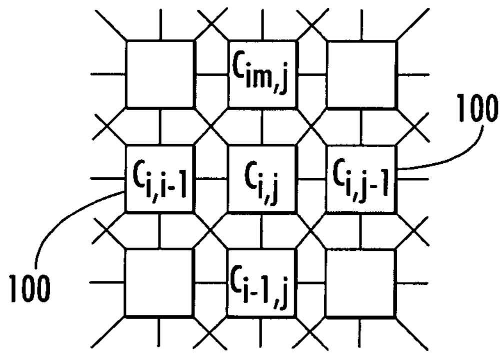
FIG. 3 is a more detailed schematic view of portions of a cellular neural network according to the present invention.

Reference I in FIG. 1 indicates an image, for example in the form of a square matrix of spots on a DNA chip (of the known type and, consequently, not illustrated in the figures).

Figure 2:
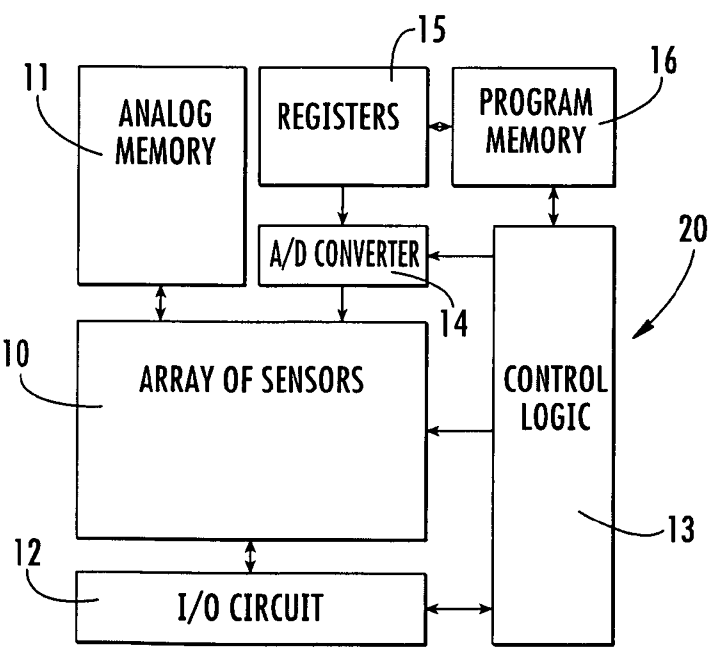
FIG. 2 is a schematic block diagram of a cellular neural network according to the present invention.

The image is "read", preserving the matrix organisation, by an optical sensor made, for example, employing CMOS technology and associated with a processing system of the type shown in FIG. 2 and indicated in general by number 20.

As further illustrated hereof, the system 20 can be configured as a cellular neural network (CNN) processing system, i.e. as an analog, parallel processing system, preferably integrated in the same chip housing the block 10 in which the optical sensor is integrated.

In particular (again with reference to the block diagram in FIG. 2), in addition to the array of analog cells with optical sensors forming the block 10 in which the optical sensor is integrated, the system preferably comprises a set of analog memories 11 which can co-operate with sensor 10, according to the criteria which are further described below, as well as an input/output circuit 12, which type is generally known.

The operation of components 10 and 12 described above is achieved under the supervision of a control logic 13.

Preferably, the control logic 13 directly acts on the circuit 12. The same control logic 13 is usually configured so to directly operate on the array 10 by means of an analog/digital converter 14 to which the instructions contained in a program memory 16 selectively flow via a set of digital registers 15 for the configuration of the cellular neural network.

According to another important characteristic of the invention, the system 20 is configured as a cellular neural network which avoids the need to implement analog/digital conversion and/or vice versa of the values of each element or pixel in the image acquired at output of the optical sensor 10, also allowing to implement the microarray image analysis algorithm according to a totally parallel processing criterion. The various operations forming the algorithm are achieved by suitably setting the parameters which are programmed in the configuration registers 15 of the neural network on a case-by-case basis.

In this way, an algorithm strictly speaking is created, being the sequence of elementary operations performed on the color image, i.e. on its chromatic elements, composed preferably by the red component R and the green component G only, i.e. with the exclusion of the blue component B, as shown in FIG. 1.

FIGS. from 3 to 5 illustrate the principle implementing the model of a cellular neural network as the array of cells 100. The cells are reciprocally identical and only locally interconnected by means of weighed synaptic connections.

Figure 5:
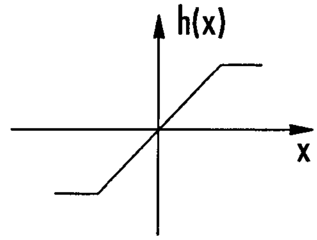
FIG. 5 is a plot of a weighted output value, h(x), as a function of an input signal, x, representative of the values used according to the present invention.
Figure 4:
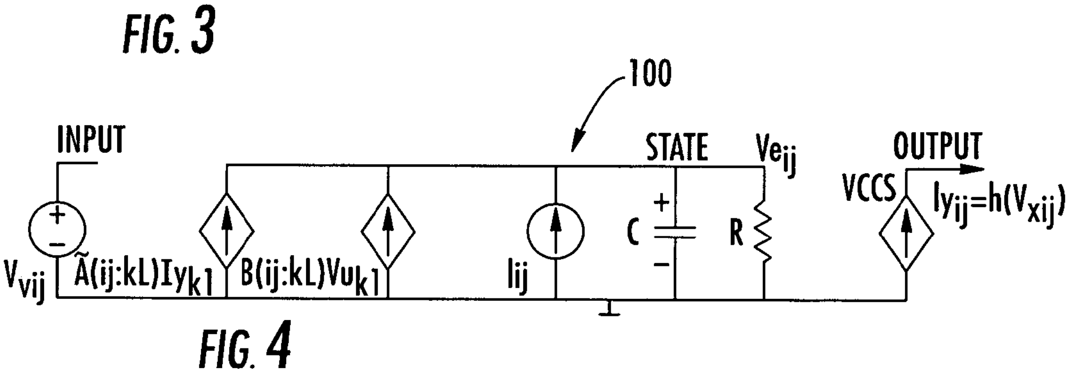
FIG. 4 is a schematic view of an electric circuit associated with the cellular network according to the present invention.

The circuit model of each cell 100 is shown in the diagram in FIG. 4, which schematically illustrates the values included in matrixes A(ij;kl) and B(ij;kl) and in the bias coefficient Iij. The values generate, from an input signal, a corresponding output value which is weighted by a function h(x) illustrated in FIG. 5.

This all corresponds to known criteria which consequently do not need to be additionally illustrated herein.

Returning to the block diagram in FIG. 2, the block 10 essentially consists of a matrix of analog cells whose inputs are the signals corresponding to the optical sensors which read the image I generated in the microarray.

The analog memory 11 is used to store the images and the intermediate processing stages. Conversely, the instructions and the respective parameters are stored in digital form in the memory 16 and in the registers 15 and are applied to the block 10 by means of the converter 14. The control logic 13 synchronizes the image acquisition and processing operations, in addition to the I/O signals to the end user which pass through the block 12.

According to Chua and Yang, the model equations of a cellular neural network are:

$$RCdx_{ij}/dt=-x_{ij}+\Sigma A(l,m)\cdot y_{lm}+\Sigma B(l,m)\cdot u_{lm}+I_{bias}$$

Where the sums extend to all values (l,m) belonging to the cells of the neighbourhood N(Cij) of the cell concerned Cij and $y_{ij}=-1$ if $x_{ij}<x_{low}$ 1 if $x_{ij}>x_{high}$ $x_{ij}$ in other cases A possible differentiation of the model, known under the name of FSR range (Full State Range) model, is related to circuit simplification when implementing the circuit with VLSI CMOS technology:

$$\tau dx_{ij}/dt=-g(x_{ij})+\Sigma A(l,m)\cdot y_{lm}+\Sigma B(l,m)\cdot u_{lm}+I_{bias}$$

where, also in this case, the sums extend to all values (l,m) belonging to N(Cij) and $g(x_{ij})=x_{low}$ if $x_{ij}<x_{low}$ $x_{high}$ if $x_{ij}>x_{high}$ 0 in other cases Obviously, the algorithms to be implemented depend on the type of analysis required by the expert. However, important steps, such as the reduction of the components, noise clearing, or the elimination of deformed spots, will need to be performed in any case. The example shows an algorithm which extracts from an image resulting from two red and green fluorescence probes the spots related to three different levels of each color indicating the three different degrees of affinity between the probes and the genes present in the micro-grid.

Figure 6:
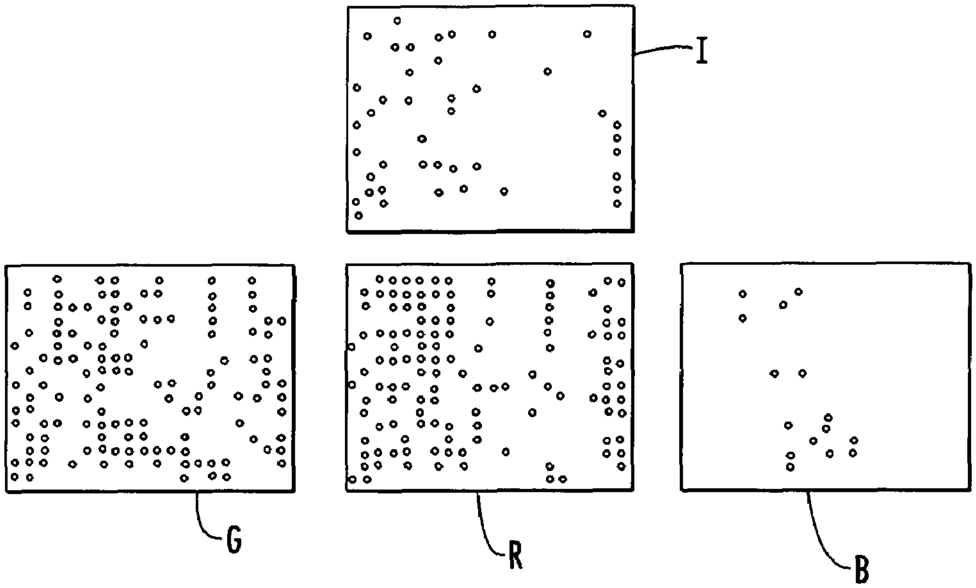
FIG. 6 is top plan view of a DNA chip after hybridisation and splitting thereof into three chromatic components as used according to the present invention.

FIG. 6 illustrates an example of image I from a DNA chip after hybridisation. For classification of affinities, analyzing the two chromatic components R (red) and G (green) only will usually suffice. This is because there are no reactions able to generate appreciable levels of the component B (blue), i.e. the third component of the known RGB (Red Green Blue) color model.

This implies firstly a possible hardware simplification of the image acquisition part, i.e. of the optical sensor comprised in the block 10.

As mentioned, optical sensors are used for reading DNA chip images (for example CMOS). The optical sensors can be either black and white sensors or Bayes four-section RGGB sensors. The resulting image is converted, after digitalisation, into an RGB, YUV image, etc., according to the type of processing and the reference application.

In the solution according to this invention, this form of pre-processing can be eliminated and simple two-color sensors, instead of Bayes sensors, can be used as sensors which are selectively sensitive to distinct chromatic components.

Furthermore, no digitalization operation is required, since a typically analog treatment is implemented. Consequently, applying an image processing sequence with cellular neural networks based on templates, for example according to the process outlined in the flow chart in FIG. 7, for each of the chromatic components (R and G) processed, will suffice.

The reader will certainly appreciate that the sequence of processing operations illustrated herein is adapted to be implemented fully in parallel, i.e. simultaneously (with a consequent reduction of total processing times) on the two chromatic components R and G. These latter are derived from the source image I in a known way, for example by filtering or by exploiting the availability of optical sensors with chromatically selective characteristics.

In essence, according to the currently preferred embodiment of this invention, the processing sequence comprises:

1. a background clearing operation, implemented in steps indicated by the numbers 201 and 301;
2. a grid analysis operation, implemented in steps indicated by the numbers 202 and 302;
3. an operation for eliminating the smaller irregular spots, implemented in steps indicated by the numbers 203 and 303;
4. an operation for eliminating the larger spots, implemented in steps indicated by the numbers 204 and 304;
5. an intensity analysis operation, implemented in steps indicated by the numbers 205 and 305;
6. a thresholding operation, for example on three levels, implemented in steps indicated by the numbers 206 and 306 and finally
7. a result combination operation in relation to the two analysed chromatic components implemented, for example, by means of a logical product (AND) in a final step indicated by the number 40.

The three levels (high, medium and low) according to which the threshold definition operation indicated by blocks 206 and 306 is carried out are respectively indicated by the numbers 2061, 2062 and 2063 (red component R) and by the numbers 3061, 3062 and 3063 (green component G).

All the operations above, including the final logic AND operation, are carried out within the cellular neural network by means of templates, i.e. by means of suitable sets of parameters which are programmed in the network configuration registers (indicated by number 15 in the diagram in FIG. 2) on a case-by-case basis. The sequence of operations gives rise to a set of intermediate results corresponding to images which can be stored in the analog memory of the system, indicated by number 11 in FIG. 2.

Figure 12:
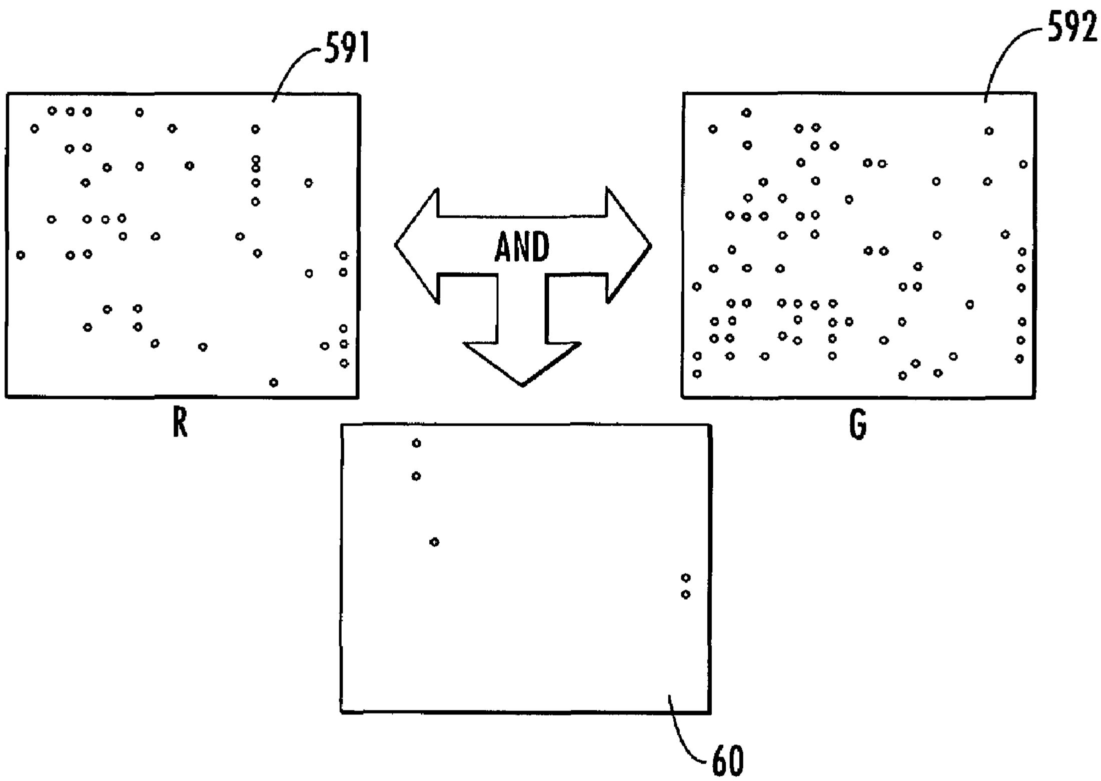

FIGS. 8 and 12 indicate, for example, the intermediate results corresponding to the main operations where certain specific operations involving filtering and segmenting and morphological operations are required in order to isolate the sources of noise which could lead to false interpretations of results during automatic analysis of the image I obtained from the microarray.

Figure 7:
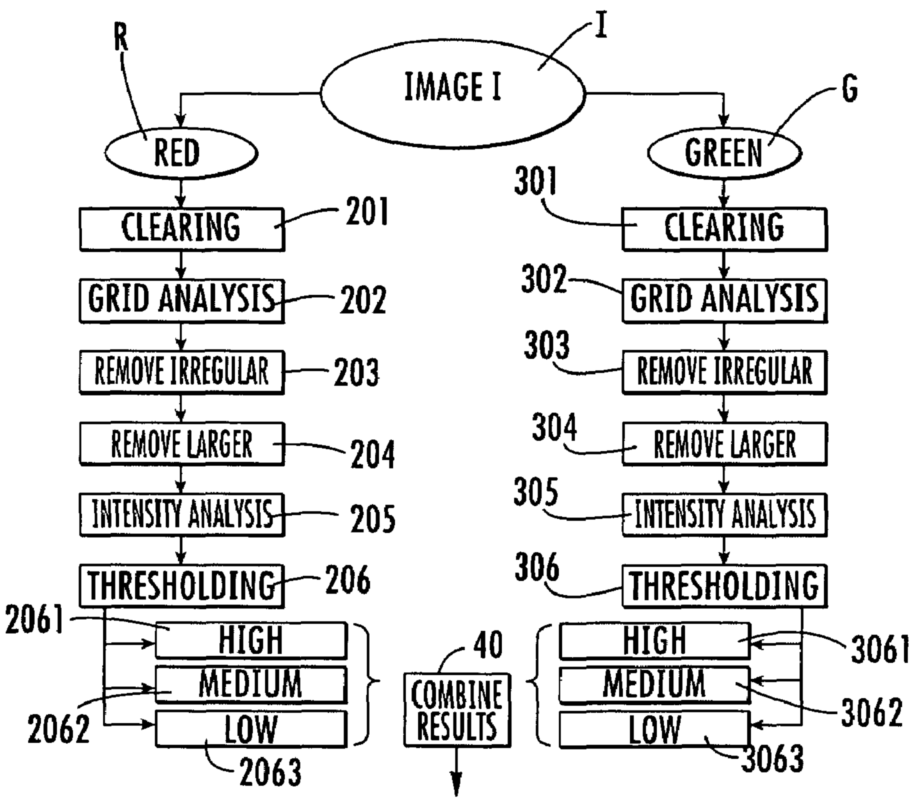
FIG. 7 is a flow chart of a method of neural network image processing applied to chromatic components of an image read from a DNA chip according to the present invention.

More in detail, FIG. 8, which is split into two parts, identified by 8*a* and 8*b*, respectively, refers to the background clearing operation (steps 201 and 301 in the chart in FIG. 7).

Figure 8A:
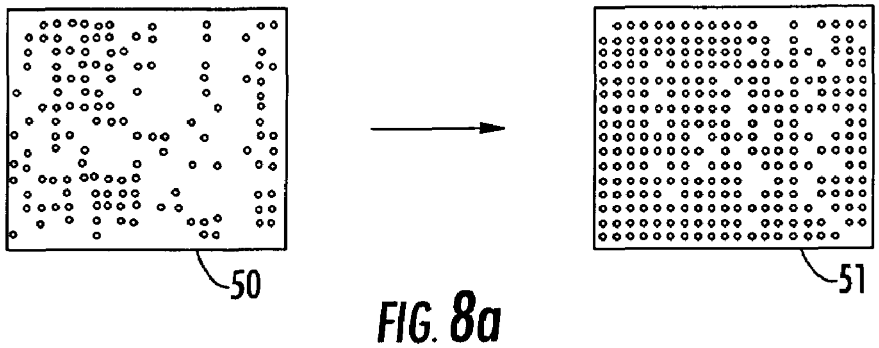
FIGS. 8*a*–12 illustrate various operations concerning filtering, segmenting, and the morphological operations, which can be implemented in a system according to this invention, can be conducted to isolate useful information with respect to the various sources of noise which could lead to false interpretations of the results during the automatic microarray image analysis process.

In a first solution, illustrated in FIG. 8*a*, the source image to be processed, indicated by number 50, consisting of a set of spots, is subjected to thresholding operation with respect to a fixed value (for example a threshold equal to 0.85 of the maximum normalised intensity value of the image) to obtain the resulting image 51.

Figure 8B:
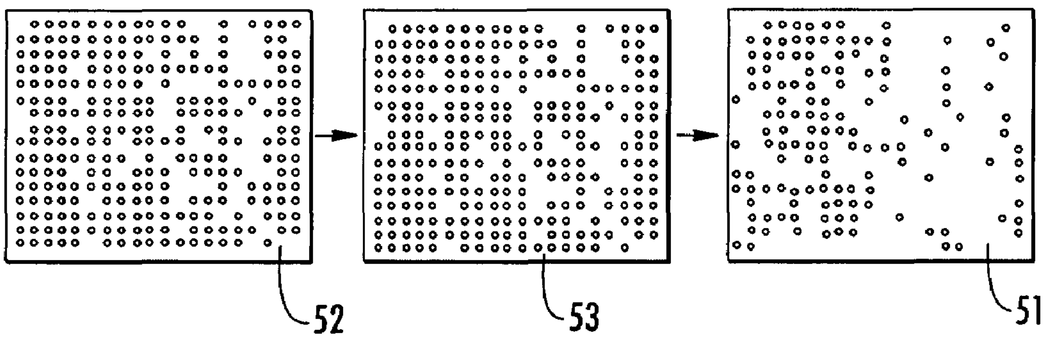

In the variant illustrated in FIG. 8*b*, the same result is attained by diffusion filtering, shown by number 52, based on the implementation of templates which put the spot contours out of focus. An averaging operation, shown by number 53, is carried out on the image thus obtained to form the resulting image, which also in this case is indicated by the number 51.

Figure 9:
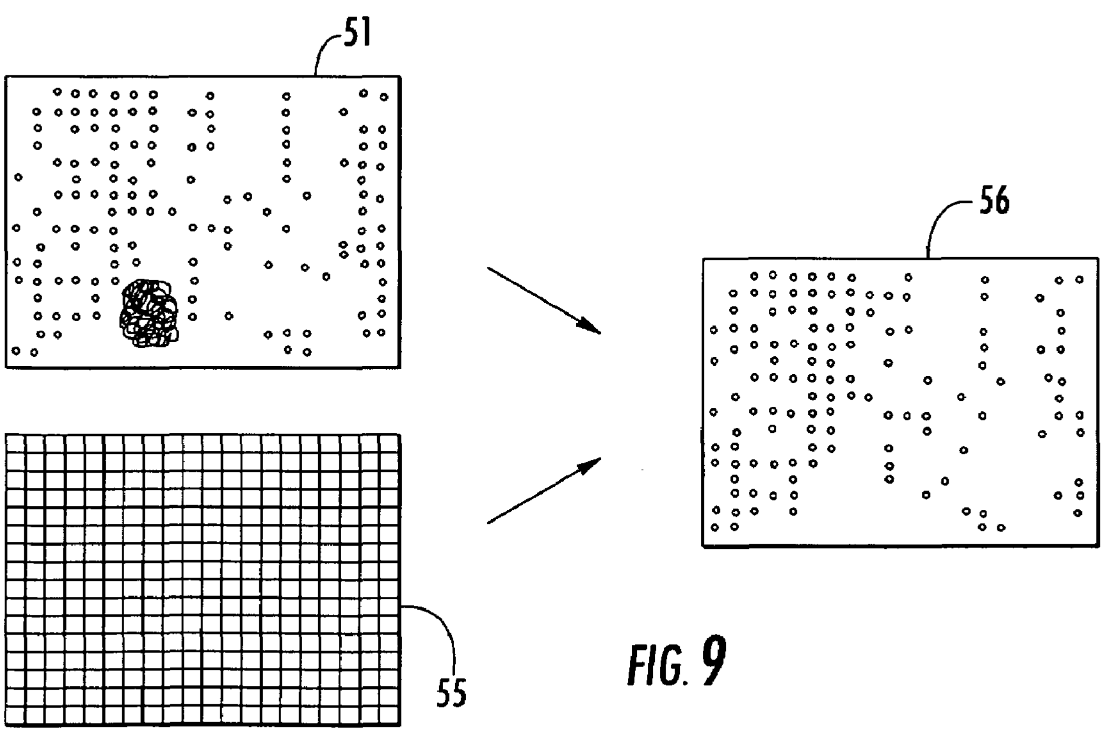

In the case in which the image processed (here supposed to coincide with the image 51 seen above, which is not imperative) is "dirty", for example, as shown in FIG. 9, for the presence of a dot which does allow to identify the spots, an additional template or grid 55 is used. Its function is to filter out the noise and eliminate the spots which overlap the contours of the grid 55. The resulting image is indicated by the number 56.

Figure 10:
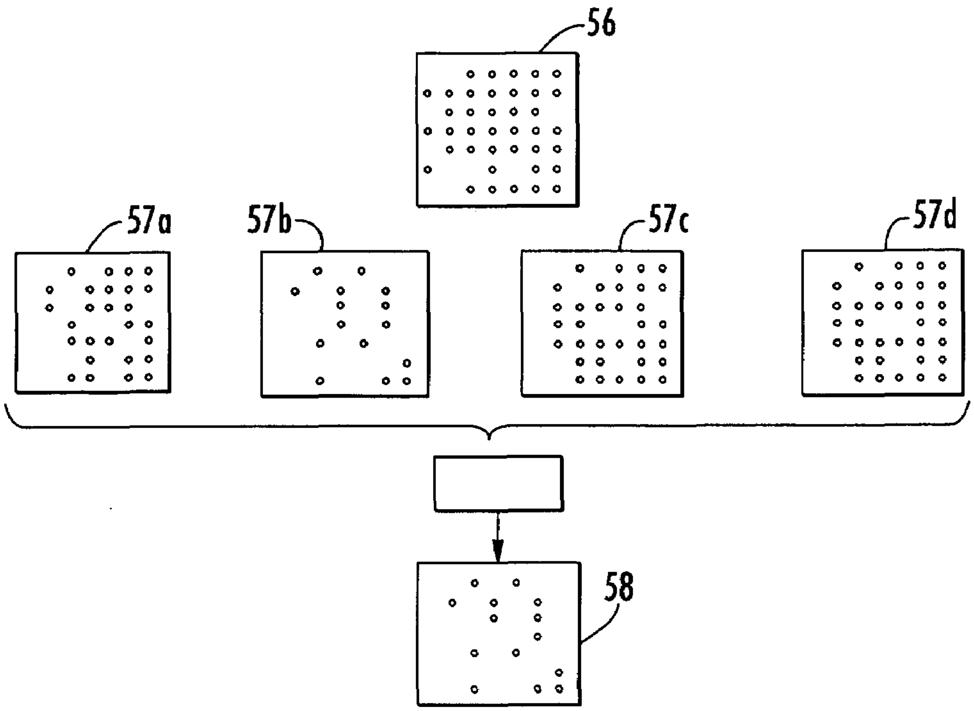
Figure 11:
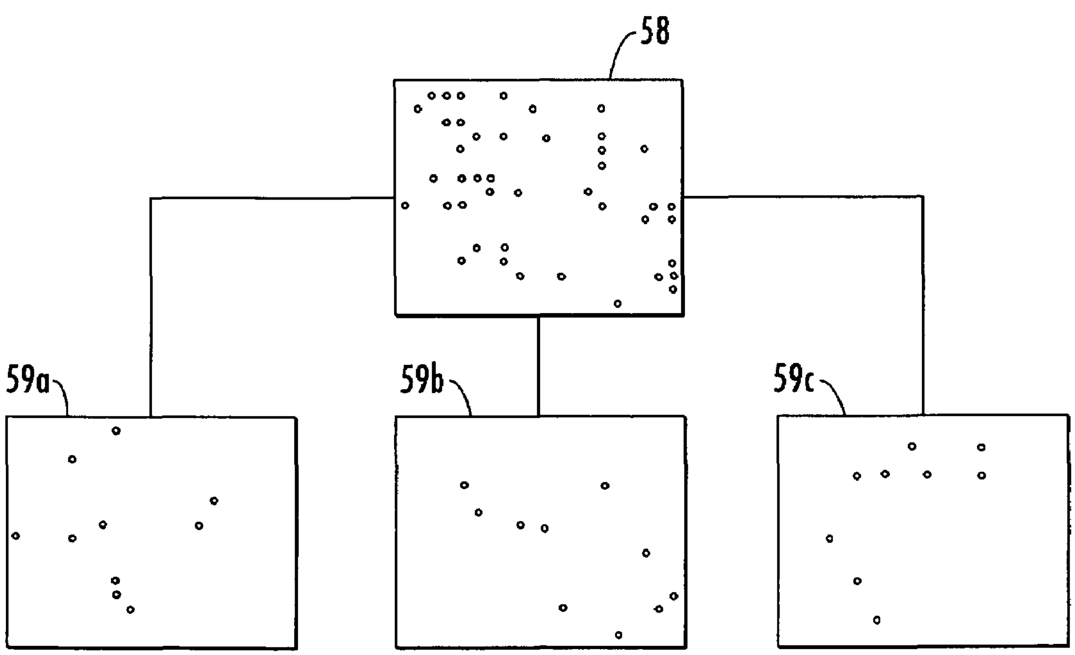

FIGS. 10 and 11 illustrate the processing sequence attained by means of two other templates.

In particular, FIG. 10 illustrates the application to a source image (here supposed to coincide with image 56, which again is not imperative) of an erosion template which can erode the spots of said image on the right-hand side 57*a*, on the left-hand side 57*b*, in the horizontal direction 57*c* and in the vertical direction 57*d*.

In this way, the shape of the spots is analysed to eliminate the irregularities of the spots by selecting only the largest circular spots.

FIG. 11, on the other hand, illustrates the sequence to implement direct intensity analysis to provide a classification of the spots in the source image (supposed to coincide with image 58 obtained above, which again is not imperative) on the basis of intensity. This occurs according to three threshold levels (for example equal to −0.5; 0 and +0.5; said threshold levels being referred to the maximum normalised intensity.

The overall result which can be obtained is the generation of three images deriving from the threshold definition (and, consequently, of an essentially binary content, i.e. "dark" or "light" for each spot) indicated by the numbers 59*a*, 59*b* and 59*c* respectively, which can be used for the logic product operation (AND), indicated by block 40 in FIG. 7.

This operation is schematically illustrated in FIG. 12. Here, references 591 and 592 indicate, in general, two threshold images which are obtained respectively for the red component R and for the green component G, combined by means of the logic product (AND), to generate a final image 60 which can be made available to an end user in the form of a display (on screen and/or hard copy) driven by unit 12 in FIG. 2.

The computing time requirements for each of the operations listed above shows a computing capacity which is much higher than the normal image processing techniques based on digital computer platforms. For example, by employing the chip time constant $t_{CNN}$ as a unit of time (which is typically in the order of 250 nanoseconds), each of the various template implementation operations described above require typically from 3 to 6 of said units of time, which values which fall to one only of said unit in the case of simple logic operators and slightly higher times (for example, 10 $t_{CNN}$ units) in the case of recall operations.

In particular, the entire algorithm described above can be run in approximately 275 microseconds, i.e. in less than 1 millisecond.

Various main advantages derive from the implementation of the solution according to this invention.

Firstly, DNA can be analysed automatically and, consequently, objectively. This contrasts with a subjective analysis carried out by human operator employing normal digital image processing tools.

The second advantage is the high processing speed which allows to process images which can also be large directly on-chip with very short processing times. Such times depend only on the value of the time constant RC of the cells in the cellular neural network and the acquisition time of the optical sensors because no analog/digital conversion (and/or vice versa) is required for the values of each pixel of the image acquired at optical sensor output with respect to the processing matrix operating in parallel with implements the analysis alqorithm of the microarray image.

Finally, the system can easily be reprogrammed by means of a restricted number of coefficients which define the templates in the cellular neural network, corresponding to the single operations stored in the internal system memory in correspondence to values of the synaptic bindings of the adjacent cells.

Naturally, numerous changes can be implemented to the construction and embodiments of the invention herein envisaged, all comprised within the context of the concept characterising this invention, as defined by the following claims. This especially refers to the possibility of applying the solution according to this invention to the processing of images of any nature. The scope of this invention is, therefore, not necessarily restricted to the processing of DNA chip images.

Having thus described at least one illustrative embodiment of the invention, various alterations, modifications, and improvements will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A system for the analysis of an image of a DNA microarray comprising an array of spots, the system comprising:

a sensor for acquiring signals corresponding to the image of the DNA microarray; and a cellular neural network (CNN) circuit to process the signals from said sensor, said CNN circuit combining different processing results associated with distinct chromatic components of the image of the DNA microarray.

2. A system according to claim 1 wherein said CNN circuit processes the signals by parallel processing.

3. A system according to claim 1 wherein said signals comprise analog signals, and wherein said CNN circuit processes the analog signals.

4. A system according to claim 1 wherein said sensor acquires signals corresponding to a fluorescence image of the DNA microarray.

5. A system according to claim 1 wherein said CNN circuit comprises at least one array of cells and synaptic connections interconnecting the cells.

6. A system according to claim 5 wherein said at least one array of cells has a spatial distribution correlated to the image of the DNA microarray.

7. A system according to claim 1 wherein said sensor and said CNN circuit are integrated in a single chip.

8. A system according to claim 1 wherein said CNN circuit comprises a memory for storing signals corresponding to the image of the DNA microarray and control logic for processing in real-time signals associated with the image in real-time.

9. A system for the analysis of an image of a DNA microarray comprising an array of spots, the system comprising:

a sensor for acquiring signals corresponding to the image of the DNA microarray; and a cellular neural network (CNN) circuit to process the signals from said sensor, said CNN circuit performing a combination operation associated with different chromatic components of the image of the DNA microarray.

10. A system according to claim 9 wherein said CNN circuit processes the signals by parallel processing.

11. A system according to claim 9 wherein said signals comprise analog signals, and wherein said CNN circuit processes the analog signals.

12. A system according to claim 9 wherein said sensor acquires signals corresponding to a fluorescence image of the DNA microarray.

13. A system according to claim 9 wherein said CNN circuit comprises at least one array of cells and Synaptic connections interconnecting the cells.

14. A system according to claim 13 wherein said at least one array of cells has a spatial distribution correlated to the image of the DNA microarray.

15. A system according to claim 9 wherein said sensor and said CNN circuit are integrated in a single chip.

16. A system according to claim 9 wherein said CNN circuit comprises a memory for storing signals corresponding to the image of the DNA microarray and control logic for processing in real-time signals associated with the image in real-time.

17. A system for the analysis of an image of a DNA microarray comprising an array of spots, the system comprising:

a sensor for acquiring signals corresponding to the image of the DNA microarray; and a cellular neural network (CNN) circuit to process the signals from said sensor, said CNN circuit combines different processing results associated with distinct chromatic components of the image of the DNA microarray and said combination operation comprises an AND logic operation.

18. A system for the analysis of an image of a DNA microarray, the system comprising:

a sensor for acquiring analog signals corresponding to the image of the DNA microarray; and a cellular neural network (CNN) circuit for parallel processing the analog signals from said sensor, and said sensor is an optical sensor responsive to a predetermined set of chromatic components of the image of the DNA microarray, and wherein said CNN circuit processes signals corresponding to the image of the DNA microarray by at least one of applying parameters associated with a cellular neural network and combining different processing results associated with chromatic components of the image of the DNA microarray.

* * * * *